(12) United States Patent
Kusuda

(10) Patent No.: US 7,353,254 B2
(45) Date of Patent: Apr. 1, 2008

(54) COLLABORATIVE CHAT SYSTEM

(75) Inventor: Rika Kusuda, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 879 days.

(21) Appl. No.: 10/282,705

(22) Filed: Oct. 29, 2002

(65) Prior Publication Data

US 2003/0088623 A1    May 8, 2003

(30) Foreign Application Priority Data

Nov. 5, 2001    (JP) .............................. 2001-339944

(51) Int. Cl.
*G06F 15/16*    (2006.01)
(52) U.S. Cl. ...................... 709/204; 709/207
(58) Field of Classification Search ........ 709/204–207, 709/230, 248
See application file for complete search history.

(56) References Cited

U.S. PATENT DOCUMENTS

2002/0113803 A1* 8/2002 Samra et al. ............... 345/619
2002/0158887 A1* 10/2002 Samra et al. ............... 345/619
2002/0171668 A1* 11/2002 Samra ........................ 345/619
2003/0009523 A1* 1/2003 Lindskog et al. ........... 709/205
2004/0181592 A1* 9/2004 Samra et al. ................ 709/220

FOREIGN PATENT DOCUMENTS

JP    2001-117849    4/2001
JP    2001-142830    5/2001

OTHER PUBLICATIONS

UNKNOWN, "XML Basics and Peripheral Technology," Software Design, No. 102, p. 117-121.

* cited by examiner

*Primary Examiner*—Jason D Cardone
*Assistant Examiner*—Mitra Kianersi
(74) *Attorney, Agent, or Firm*—Duke W. Yee; A. Bruce Clay; Theodore D. Fay, III

(57) ABSTRACT

To provide a collaboration system and its chat system wherein a chat can be conducted by designating clearly and simply a position of an object to be noticed in a working image.
[Constitution] A plurality of terminal devices 100 and a chat server 300 supporting a chat are provided. By managing a display position, on a display screen, of a chat window for performing a chat in the terminal devices 100 and the chat server 300, display positions of chat windows are synchronized between the terminal devices 100 that conduct a chat. The chat window is displayed correspondingly to a given element displayed on the display screen.

3 Claims, 15 Drawing Sheets

| CHAT WINDOW ID | SESSION ID | ELEMENT POSITION | URL | MESSAGE |
|---|---|---|---|---|
| 123 | 1019 | #root().child(3,H1), string(1,"64MB Memory") | http://pc.com/helpcenter/memory.html | |
| 789 | 1019 | #root().child(3,H1), string(1,"128MB Memory") | http://pc.com/helpcenter/memory.html | |
| 456 | 1020 | #root().child(3,H1), string(1,"in-house important information") | http://pc.com/helpcenter/memory.html | |
| 902 | 1111 | #root().child(3,H1), string(1,"inquiry content") | http://pc.com/helpcenter/sendq.html | Please tell me a distributor handling this commodity. |
| 903 | 111 | #root().child(3,H1), string(1,"commodity desired to buy") | http://pc.com/helpcenter/sendq.html | Is there no corporation price ? |
| ⋮ | ⋮ | ⋮ | ⋮ | ⋮ |

FIG. 5

| SESSION ID | SENDER ADDRESS | RECEIVER ADDRESS 1 | RECEIVER ADDRESS 2 | ... |
|---|---|---|---|---|
| 1019 | 10.12.3.1 | 9.68.1.1 | | ... |
| 1020 | 9.68.1.1 | 9.33.4.5 | | ... |
| 1111 | 9.4.2.4 | 9.2.4.1 | 9.8.5.33 | ... |
| ⋮ | ⋮ | ⋮ | ⋮ | ⋮ |

FIG. 6

| URL | ELEMENT POSITION | USER ID OF ACCESSIBLE USER |
|---|---|---|
| http://pc.com/helpcenter/memory.html | #root().child(3,H1), string(1,"in-house important information") | agent1, agent2, agent3, super1, super2 |
| ⋮ | ⋮ | ⋮ |

FIG. 7

| USER ID | USER ID OF ACCESSIBLE USER |
|---|---|
| agent1 | super1, super2, super3 |
| ⋮ | ⋮ |

FIG. 8

(A) 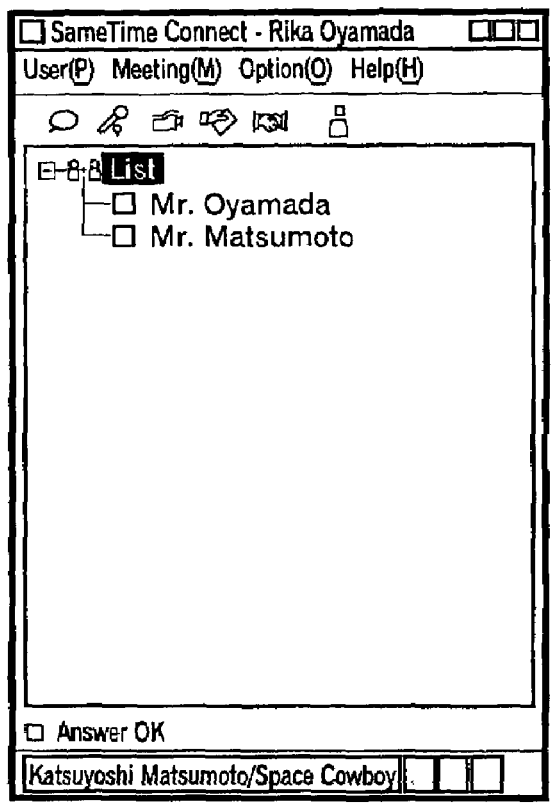
(B) 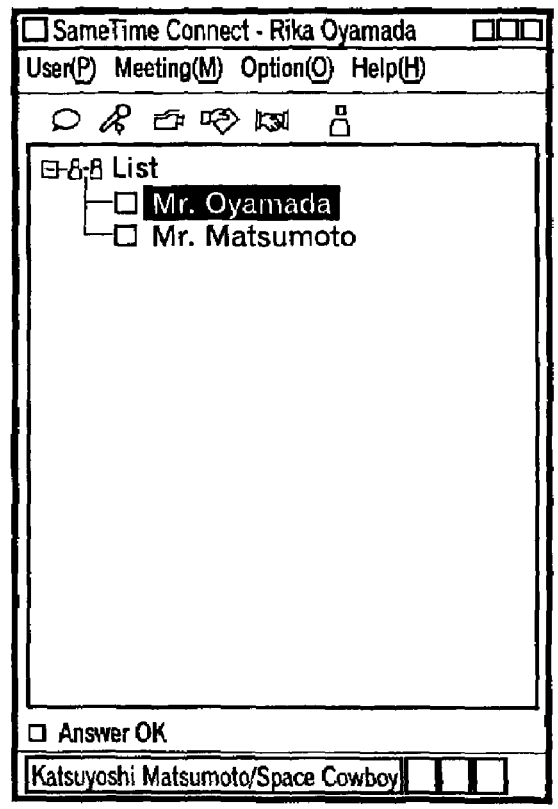
FIG. 11

| Async ID | CHAT WINDOW ID 1 | CHAT WINDOW ID 2 | ... |
|---|---|---|---|
| 1 | 902 | 903 | ... |
| ⋮ | ⋮ | ⋮ | ⋮ |

COLLABORATIVE CHAT SYSTEM

DETAILED DESCRIPTION OF THE INVENTION

1. Field of the Invention

The present invention relates to a system for performing collaborative work using a plurality of computers connected to each other via a network.

2. Background of the Invention

Among a plurality of computers connected to each other via a network, input/output operations, or data processing can be synchronized. Specifically, for example, a shared image is displayed on display units of the plurality of computers, or an input to any one of the computers is reflected on the other computers. Using this technique, there has been spreading such a system wherein a plurality of users utilizing computers display a shared working image on display units of the respective computers so as to implement collaborative work (hereinafter, this system will be referred to as "collaboration system").

In the collaboration system of this type, a so-called chat system is utilized as communication means, wherein text data input into any one of the computers is also displayed in other computers, thereby to have a realtime conversation.

Further, in the collaboration system, an underline or mark is entered on a Web page using an annotation function to designate a position to be noticed on the Web page.

FIG. 19 is a diagram showing an example of a schematic structure of the collaboration system. A computer (terminal device) 1911 and a computer (terminal device) 1912 are connected to each other via a network, and collaborative work is performed using functions of the computers 1911 and 1912 that are realized based on services and program controls offered by a Web server 1920 and a chat server 1930 on the network. Here, a Web page offered from the Web server 1920 as a working image is displayed in a window of a display unit of each of the computers 1911 and 1912, and input/output operations in the shared Web page are synchronized between the computers 1911 and 1912. Further, windows for chat (chat windows) are displayed in the display units of the computers 1911 and 1912, and input/output operations for text data in the chat windows are synchronized under the control of the chat server 1930.

In the collaborative work in the conventional collaboration system, it has been general to display one chat window, used as a communication tool, on a screen of the display unit of each of the computers 1911 and 1912.

PROBLEMS SOLVED BY THE INVENTION

However, in the foregoing conventional collaboration system, when having a chat about certain contents to be noticed on a working image (Web page), it has been difficult to clearly and simply designate a position of such contents on the working image. For example, it is necessary in a chat to identify a position of an object to be noticed by a composition, such as "—a portion located at the fifth from the top, wherein xxx is written—" considering a layout of the working image, so that time and labor are required for inputting and reading a composition, and further, misunderstanding is liable to occur.

If the position of the object to be noticed is shown in a graphic form using an annotation, the target position can be precisely specified. However, because a type and position of an annotation to be noticed should be expressed by a composition in a chat, time and labor are similarly required.

Further, if annotations of the same type are increased on the working image, identification using a composition becomes likewise difficult, resulting in spoiling accuracy of position designation that would be otherwise ensured by using the annotation.

Therefore, it is an object of the present invention to realize a collaboration system and a chat system thereof, wherein a chat can be performed while clearly and simply designating a position of an object to be noticed in a working image.

MEANS FOR SOLVING THE PROBLEMS

For accomplishing the foregoing object, the present invention can be realized as a chat system having the following configuration. Specifically, the chat system comprises a plurality of terminal devices and a chat server for supporting a chat performed between the terminal devices, wherein the terminal device going to start a chat displays a chat area for conducting the chat in a display unit, and sends to the chat server information about a position of the chat area and information for identifying the connection target terminal device, the chat server establishes a session relative to the connection target terminal device based on the received information for identifying the connection target terminal device, and sends the information about the position of the chat area to the connection target terminal device, and the connection target terminal device displays a chat area for conducting the chat, at a position on a display screen identified by the information about the position of the chat area.

More specifically, it is characterized in that the terminal device going to start a chat sends to the chat server a position of an element adjacent to a display position of the chat area on a display screen of the display unit, as the information about the position of the chat area. If this element is an element of HTML on a Web page, the position can be designated using a standard technique such as XPointer or XPath.

The terminal device can conduct chats by displaying a plurality of chat areas in the display unit. In this event, the chat server can establish a plurality of sessions independently of each other depending on the plurality of chat areas.

Further, when the chat server can not establish the session relative to the connection target terminal device, the terminal device can input a message into the chat area in an asynchronous mode and send the message to the chat server. When the message input in the asynchronous mode is received, the chat server preserves it, and sends the preserved message to the respective terminal devices after the session is established relative to the connection target terminal device.

Further, the present invention can be realized as a chat system for conducting a chat between a plurality of terminal devices connected to each other via a network, having the following configuration. In this chat system, it is characterized in that the terminal device comprises session managing means for managing a session in the chat, and display control means for displaying a chat area for conducting the chat on a display screen, and that the display control means in the plurality of terminal devices performing the session managed by the session managing means synchronize display positions of the chat areas.

Further, the present invention can be realized as an information processing system (collaboration system) using the foregoing chat system as communication means in collaborative work performed on a Web page.

Particularly, by associating the Web page used in the collaborative work and the chat according to the chat system with each other, the information processing system having the following configuration can be realized. Specifically, it is characterized in that a first and a second terminal device are provided, each displaying a chat area for conducting a chat in a display unit, and conducting the chat in the chat areas, and that the first terminal device displays the chat area correspondingly to an element on the Web page for the collaborative work displayed in the display unit, and the second terminal device displays the chat area correspondingly to the element associated with the chat area of the first terminal device, on the Web page displayed in the display unit.

Moreover, the present invention can be realized as a terminal device connected to a network, having the following configuration. Specifically, it is characterized in that the terminal device comprises a sending/receiving section connected to another terminal device via the network to perform sending and reception of data, a display control section for displaying a chat area for conducting a chat with the other terminal device being a connection target, correspondingly to a desired element displayed on a display screen, and a session managing section for managing a session of the chat per chat area.

Here, it is characterized in that the display control section displays a plurality of chat areas depending on elements displayed on the display screen.

Further, it is characterized in that the display control section displays a mark at or near a display position of the element associated with the chat area, the mark representing that the chat area is being set irrespective of the display state of the chat area. When the chat area is in the non-displaying state, it can be set to the displaying state by a command input from the user relative to this mark, such as a mouse click on this mark.

The foregoing terminal device can be configured to further comprise a data storing section for storing a message exchanged in the chat conducted in the chat area.

Further, the present invention can be realized a chat server for supporting a chat conducted by a plurality of terminal devices connected to each other via a network, having the following configuration. Specifically, it is characterized in that the chat server comprises a sending/receiving section connected to the terminal devices via the network to perform sending and reception of data, a session managing section for managing a session in a chat, and a chat area managing section for managing information about chat areas set in the terminal devices to serve as an interface of a chat performed in the session managed by the session managing section, and that the chat area managing section manages at least information about a display position of the chat area in display means of each of the terminal devices.

Here, the chat area managing section preserves a message correspondingly to the chat area, the message sent from the certain terminal device in an asynchronous mode by inputting it into the chat area in the state where a session between the terminal devices is not established. When the session relative to the terminal device being a sending target of the message is established, the sending/receiving section acquires the preserved message from the chat area managing section and sends it to the terminal devices.

The foregoing chat server can be configured to further comprises an access control section for executing an access control relative to the terminal devices participating in the chat conducted in the chat area, depending on data associated with the chat area.

Further, the present invention can be realized as an information exchange control method for a chat server supporting a chat conducted by a plurality of terminal devices connected to each other via a network. Specifically, it is characterized in that this information exchange control method comprises the steps of receiving from the certain terminal device a session establishment request including information about a display position of a chat area for performing a chat, and establishing a session of the chat between the plurality of terminal devices in response to the session establishment request, receiving a message of the chat in the session from the certain terminal device participating in the session, and sending the message and the information about the display position of the chat area to the other terminal devices participating in the session.

Preferably, the information exchange control method further comprises the steps of preserving the message when the session can not be established, and sending the preserved message to the other terminal devices participating in the session after the session is established.

The information about the display position of the chat area can be position information designated in association with a particular element on a given Web page. In this case, the message is received along with the position information at the foregoing step of receiving the message.

Further, the present invention can be realized in the form of a program for controlling a computer to operate as the foregoing terminal device or chat server, or to execute the foregoing information exchange control method. Such a program can be offered by storing it in magnetic or optical disks, semiconductor memories or other recording mediums and distributing them, or by delivering it via a network.

PREFERRED EMBODIMENT OF THE INVENTION

Hereinbelow, the present invention will be described in detail based on a preferred embodiment shown in the accompanying drawings.

In this embodiment, explanation will be made of a Web-based collaboration system using a chat system as communication means, as an example.

FIG. 1 is a diagram showing the overall structure of a collaboration system according to this embodiment.

Referring to FIG. 1, the collaboration system of this embodiment comprises a plurality of terminal devices 100 that perform collaborative work, a Web server 200 offering Web pages on which the collaborative work is done by the terminal devices 100, and a chat server 300 that supports a chat between the terminal devices 100. The respective devices are connected to each other via the Internet or another network.

The terminal device 100 is realized by a personal computer, a workstation or another computer device. Although two terminal devices 100 are shown in FIG. 1, three or more terminal devices may be practically connected to each other. In the following description, if it is necessary to distinguish between a sending side and a receiving side with respect to data or the like in a chat or collaborative work, a terminal device is described as a sending side terminal device 10a or a receiving side terminal device 100b, while if the distinction is not necessary, it is merely described as a terminal device 100.

The terminal device 100 realized by a computer device comprises, as a hardware structure, a CPU (Central Processing Unit) executing data processing by a program control, storage devices such as a main memory and a magnetic disk device storing programs for controlling the CPU and various data, a display unit such as an LCD (Liquid Crystal Display) or CRT display as output means, input devices such as a keyboard and a mouse, and a network interface for connection to the other terminal device 100, the Web server 200 and the chat server 300 via the network.

FIG. 2 is a functional block diagram showing a functional configuration of the terminal device 100.

Referring to FIG. 2, the terminal device 100 comprises, as functions of controlling a chat as communication means in the collaborative work, a chat window displaying section 111 and a chat window managing section 112 for displaying a chat window being an area for performing a chat in the display unit and controlling an input and output of the content of the chat, a chat content keeping section 113 for storing the chat content in the storage device, and a message sending/receiving section 114 for controlling the network interface to exchange messages relative to the other terminal device 100. Although not particularly shown, the terminal device 100 further comprises collaboration control means for controlling normal collaborative work wherein operations to a Web page (input to input form, scroll, moving of displayed page, writing by annotation or the like) are synchronized, and control means for generally controlling them.

Here, the respective components shown in FIG. 2 are virtual software blocks realized in the CPU by controlling a program stored in the storage device of the terminal device 100. This program may be configured as an independent application program, or may be realized as an applet or JavaScript in Java and offered upon conducting collaborative work or a chat. The program may be stored in a magnetic or optical disk, a semiconductor memory or another recording medium and distributed, or may be delivered via the network, depending on a type thereof.

The foregoing chat window displaying section 111 is a display control section for a chat window and displays a chat window for conducting a chat in the display unit. In this embodiment, it is possible to display a plurality of chat windows at desired positions in a display screen of the display unit.

FIG. 3 is a diagram showing the state wherein chat windows are displayed in a window of a browser (hereinafter referred to as "browser window") displaying a Web page, by the chat window displaying section 111.

Referring to FIG. 3, two chat windows 412 are displayed on a Web page of a browser window 411. In this embodiment, as described later, it is possible to conduct a chat per element of HTML existing on the Web page. Therefore, the chat window displaying section 111 displays the chat windows 412 at positions pointing elements (in the example shown, texts described as "64 MB memory" and "PC-100—"). For identifying the chat window 412 and the element on the Web page, the chat window 412 has a blowoff shape in the shown example, but another display manner may be used wherein, for example, a desired element and the chat window 412 are connected by an arrow.

Further, in this embodiment, as described later, an independent session can be established per chat window 412 to allow a chat to be conducted independently. Therefore, in each chat window 412 shown in FIG. 3, there are provided a title column for identifying an element to be noticed, a message column for displaying the content of a chat, and an input column for inputting a message to be sent, and further provided a send button for sending a message entered in the input column, and a finish button (displayed as "close" in the figure) for finishing the session.

The chat window displaying section 111, in response to receipt of an input of a command from a user of the terminal device 100 to open a chat window 412, opens the chat window 412 at a position specified in the command. The command input by the user can be accomplished by, for example, right-clicking a mouse at a position of a desired element on the Web page to display an operation menu and selecting an operation item to open the chat window 412.

After having been displayed, the chat window 412 can be freely changed in size or set to an non-displaying state (e.g. minimization in Windows being an operating system of Microsoft Corporation). In this embodiment, the chat system is utilized in the collaboration system wherein the collaborative work using Web pages is performed. Accordingly, the display state of the chat window 412 can be changed in association with the collaborative work on the Web page supported by the Web server 200. For example, after the chat window 412 is displayed on the Web page displayed in the browser window 411, when an element of HTML pointed by the chat window 412 is not displayed due to scrolling of the browser window 411 or moving of the displayed Web page, the chat window 412 can also be set to a non-displaying state. In this case, when the element concerned is again displayed by scrolling of the browser window 411 or moving of the Web page, the corresponding chat window 412 can also be set back to a displaying state.

Further, when the chat window 412 is displayed, a proper mark (black circle shown in FIG. 3) is displayed at a position of an element pointed by the chat window 412, thereby to definitely show the selection of such an element. The mark may be displayed as a function of the chat window displaying section 111, or in association with an annotation function supported by the Web sever 200. When the chat window 412 is set to the non-displaying state, a user can recognize based on the indication of this mark that the chat window 412 is set relative to the corresponding element.

The chat window managing section 112 manages a session per chat window 412 displayed by the chat window displaying section 111. For managing the sessions, a managing table 120 is used wherein chat window IDS identifying chat windows 412 and session IDS identifying sessions are associated with each other. By managing a session per chat window 412, if, for example, a plurality of chat windows 412 are set relative to a single Web page, a chat can be conducted with a different conversational partner per chat window 412.

The chat content keeping section 113 stores the content of a chat performed in the chat window 412 into the storage device, being a data storing section, of the terminal device 100. The chat content may be stored independently per chat window 412, or the chat contents in all the chat windows 412 or some chat windows 412 designated by a user may be collectively stored. Information stored by the chat content keeping section 113 includes a message being the chat content, a chat sender name (including user ID etc.), input date and time, a title of an element to which the chat window 412 is set, a URL of a Web page on which the chat window 412 is set, and so on. By storing the title of the corresponding element together, even when the chat contents in a plurality of chat windows 412 are collectively stored, it is possible to determine which message corresponds to which element. Further, when searching the past chat contents (log), the chat content keeping section 113 makes a search individually per chat window 412, or makes a search collectively over the chat contents in all the chat windows 412 or some chat windows 412 designated by a user.

The message sending/receiving section 114 is connected to the chat server 300 via the network interface of the terminal device 100 and the network, and sends and receives messages to and from the other terminal device 100 in a session managed by the chat server 300.

The Web server 200 is realized by a personal computer, a workstation or another computer device. Although not particularly shown, the Web server 200 realized by the computer device comprises, as a hardware structure, a CPU (Central Processing Unit) executing data processing by a program control, storage devices such as a main memory and a magnetic disk device storing programs for controlling the CPU and various data including Web pages, and a network interface for connection to the terminal devices 100 via the network.

As described above, the Web server 200 is connected to the plurality of terminal devices 100 via the network to offer Web pages in response to requests from the terminal devices 100. On these Web pages, collaborative work is implemented by the terminal devices 100.

The chat server 300 is realized by a personal computer, a workstation or another computer device.

FIG. 4 is a functional block diagram showing a functional configuration of the chat server 300.

Referring to FIG. 4, the chat server 300 comprises a chat window managing section 311 for managing chat windows 412 of the terminal devices 100 wherein a session is established, a session managing section 312 for managing sessions, an ACL (Access Control List) managing section 313 for executing an access control in a chat, a message sending/receiving section 314 for controlling a network interface to exchange messages relative to the terminal devices 100, a chat content keeping section 315 for storing the chat contents in a storage device, and an asynchronous mode managing section 316 for managing an operation according to an asynchronous mode. Although not particularly shown, control means is further provided for generally controlling them. The chat server 300 realized by the computer device comprises, as a hardware structure, a CPU (Central Processing Unit) executing data processing by a program control, storage devices such as a main memory and a magnetic disk device storing programs for controlling the CPU and various data, and a network interface for connection to the terminal devices 100 via the network.

Here, the respective components shown in FIG. 4 are virtual software blocks realized in the CPU by controlling a program stored in the storage device of the chat server 300. This program may be stored in a magnetic or optical disk, a semiconductor memory or another recording medium and distributed, or may be delivered via the network.

The chat window managing section 311 of the chat server 300 manages information about chat windows 412 used in a chat between the terminal devices 100.

FIG. 5 is a diagram showing an example of a chat window managing table that is used by the chat window managing section 311 for managing the information about the chat windows 412 in this embodiment. A chat window managing table 320 is stored in the storage device of the chat server 300.

Referring to FIG. 5, the chat window managing table 320 stores, for each of the terminal devices 100 establishing chat sessions, a chat window ID for identifying a chat window 412, a session ID for identifying a session, a position of an element on a Web page pointed by the chat window 412, a URL (Uniform Resource Locator) of the Web page on which collaborative work is being performed, and a message entered in the chat window 412, correspondingly to each other. The position of the element pointed by the chat window 412 is designated by XPointer, for example. It is also possible to designate the element position using X-Y coordinates of the browser window 411. However, in case of the collaborative work on the Web page, if XPointer is used, the element position can be specified without depending on the resolution and display font of the screen in the display unit.

By managing the position of the element pointed by the chat window 412 along with the chat window ID and the session ID as described above, it is possible to display the chat window 412 in the same position on the Web page displayed in the terminal device 100 of the chat partner. That is, the display positions of the chat windows 412 can be synchronized between the terminal devices 100 conducting a chat.

The session managing section 312 manages sessions in chats between the terminal devices 100.

FIG. 6 is a diagram showing an example of a session managing table that is used by the session managing section 312 for the session management in this embodiment. A session managing table 330 is stored in the storage device of the chat server 300.

Referring to FIG. 6, the session managing table 330 stores a session ID, and addresses of a sender and receiver in the session concerned, correspondingly to each other. Instead of the addresses of the sender and receiver, the respective user IDs may be stored. In this case, another table is separately required for defining correspondence between the user IDs and the addresses. A plurality of receivers can be set in one session and, in this event, receiver addresses are registered in the session managing table 330 depending on the number of the receivers.

When establishment of a new chat session is requested, the ACL managing section 313 refers to an ACL (Access Control List) 340 to judge whether it is an acceptable session or not, thereby to execute an access control.

FIGS. 7 and 8 are diagrams showing examples of the ACL 340, wherein FIG. 7 is a list registering a Web page (URL) being an object of collaborative work and users who are accessible to an element thereof, and FIG. 8 is a list registering a combination of users who can chat. The ACL 340 is stored in the storage device of the chat server 300.

When an operation is performed for establishing a chat session between the given terminal devices 100, the ACL managing section 313 judges whether the session concerned is between chattable users, or whether a Web page or an element is accessible by both users. Then, if the session is acceptable, the ACL managing section 313 sets information about the session concerned in the chat window managing table 320 and the session managing table 330 so that the session concerned is managed by the chat window managing section 311 and the session managing section 312.

The message sending/receiving section 314 is connected to the plurality of terminal devices 100 via the network interface of the chat server 300 and the network, and supports sending and reception of messages in chats managed by the chat window managing section 311 and the session managing section 312.

The chat content keeping section 315 stores the chat contents in the executed sessions into the storage device, being a data storing section, of the chat server 300. Specifically, the user can store the chat contents by selecting either one of the chat content keeping section 113 of the terminal device 100 and the chat content keeping section 315 of the chat server 300, or in both of them.

When a realtime chat can not be performed due to circumstances of a user or the like, the asynchronous mode managing section 316 realizes an asynchronous mode wherein message exchange is implemented asynchronously. In the asynchronous mode, a message (inquiry or the like) is input beforehand and preserved and, when a session with a target chat partner is established, the preserved message is sent to the terminal devices 100 on the sending and receiving sides, respectively. The detailed operation of the asynchronous mode will be described later.

Now, operations in the foregoing system will be described when a session is established by the plurality of terminal devices 100 and the chat server 300, and a chat is conducted between the terminal devices 100.

FIG. 9 is a flowchart for explaining an operation when the terminal device 100 going to start a chat accesses the chat server 300 to establish a session, and FIG. 10 is a flowchart for explaining an operation of the chat server 300 on that event.

In the initial state, it is assumed that the browser window 411 is already opened to display a desired Web page in the display unit of the terminal device 100. It is further assumed that the user conducts a chat about a certain element on this displayed Web page.

Referring to FIG. 9, in the terminal device 100, the user first selects a position, where a chat window 412 is opened, in the browser window 411 where the Web page is displayed, and inputs a command to open the chat window 412 into the terminal device 100 (step S901). For example, as described above, the command can be input by right-clicking the mouse and then clicking "chat" in the displayed menu.

In response to this click operation, the terminal device 100 recognizes an element of HTML subjected to a chat to acquire position information thereof, acquires a URL of the Web page, and sends those items of information along with a user ID to the chat server 300 as a session establishment request (step S902). Here, the user ID may be anything as long as it is information that can identify the user, the terminal device 100 the user uses, or the like. When offering the chat service according to this embodiment to a registered user, the following procedure may be supposed as an example, wherein the user logs on the chat server 300 by inputting a password etc. and, after going through a user check etc. by the chat server 300, receives a user ID from the chat server 300, and then makes a session establishment request using the received user ID.

Then, when a chat window ID and a list of connection targets accessible as chat partners are received from the chat server 300 in response to the session establishment request, the terminal device 100 sets the chat window ID in the managing table 120 by the chat window managing section 112, prepares a list of connection target candidates based on the received list by the chat window displaying section 111 (step S903), and displays a selection window for selecting a connection target in the display unit (step S904). On the other hand, if the access control is not executed in the session, the accessible connection target list is not sent from the chat server 300, so that all the terminal devices 100 that can perform a chat session are displayed as connection target candidates.

FIG. 11 is a diagram showing an example of the connection target selection window. From a list shown in FIG. 11 at (A), the user selects a desired connection target as shown in FIG. 11 at (B) (in the shown example, "Ms. Oyamada") (step S905). A plurality of connection targets can also be selected.

When the connection target is selected from the selection window, the terminal device 100 sends a connection request for connection to the selected connection target to the chat server 300 along with the user ID, the chat window ID and information identifying the selected connection target (step S906). When the session is established, the chat window ID and a corresponding session ID are sent from the chat server 300.

When the chat window ID and the session ID as a pair are received from the chat server 300, the terminal device 100 sets the session ID correspondingly to the associated chat window ID in the managing table 120, by the chat window managing section 112 (step S907). Then, by the chat window displaying section 111, the terminal device 100 displays the chat window 412 at the position selected at step S901, and displays a given mark at a position of an element of HTML pointed by the chat window 412 (step S908).

Thereafter, when the user inputs a message relative to the chat window 412 and performs a sending operation such as pushing the send button, the terminal device 100 acquires, from the managing table 120, the session ID corresponding to the chat window ID of the chat window 412 concerned, and sends the session ID to the chat server 300 along with the user ID, the chat window ID and the input message. Then, the terminal device 100 displays a message received from the chat server 300 in the associated chat window 412. Details of an operation after the receipt of the message will be described later.

On the other hand, in FIG. 10, when the session establishment request sent from the sending side terminal device 100a at step S902 in FIG. 9 is received, the chat server 300 checks, by the ACL managing section 313, the ACL 340 with respect to the element based on the user ID, the URL and the position information of the element attached to the session establishment request (step S1001). Then, if the establishment of the session is possible in the access control, the chat server 300, by the chat window managing section 311, allocates the unique chat window ID in response to the request, and sets the allocated chat window ID, the URL of the associated Web page and the position information of the element of HTML subjected to a chat in the chat window managing table 320 (steps S1002 and S1003). Then, the chat server 300 prepares the list of users (connection targets) that are chattable relative to the user ID concerned, the URL concerned and the element concerned, and sends it to the sending side terminal device 100a (step S1004).

When access in the requested session is limited, the chat server 300 sends a message that the session can not be established, to the sending side terminal device 100a and finishes the processing (steps S1002 and S1008).

When the access control is not executed, the check of the ACL 340 at step S1001 and the preparation of the list at step S1004 may not be carried out.

Then, when the connection request sent from the terminal device 100 at step S906 in FIG. 9 is received, the chat server 300 shifts to an operation to establish a session with the terminal device 100 (receiving side terminal device 100b) of the chat partner (connection target) designated in the received connection request (step S1005). Details of this operation will be described later.

Thereafter, when a notification that a session is possible is received from the receiving side terminal device 100b, the chat server 300, by the chat window managing section 311, prepares the session ID and sets it correspondingly to the associated chat window ID in the chat window managing table 320. Further, the chat server 300 sets, by the session managing section 312, the session ID of the session concerned, the address of the sending side terminal device 100a and the address of the receiving side terminal device 100b in the session managing table 330 (steps S1006 and S1007).

On the other hand, when a notification that a session is not possible is received from the receiving side terminal device 100b, the chat server 300 sends a message that the session can not be established to the sending side terminal device 100a, and finishes the processing (steps S1006 and S1008).

Thereafter, when a message is sent from the sending side terminal device 10a in the session managed by the session managing section 312 and the session managing table 330 as described above, the chat server 300, by the session managing section 312, refers to the session managing table 330 based on the session ID sent along with the message, thereby to recognize the receiving side terminal device 100b being the connection target. Then, the chat server 300 sends the message to the receiving side terminal device 100b.

FIG. 12 is a flowchart for explaining an operation of the receiving side terminal device 100b when the session is established between the chat server 300 and the receiving side terminal device 100b.

In FIG. 12, when a connection request sent from the chat server 300 at step S1005 in FIG. 10 is received (step S1201), the receiving side terminal device 100b examines whether the same is in a connectable state (step S1202), and sends the notification (ack or nack) representing connectable or non-connectable to the chat server 300 (step S1203).

FIG. 13 is a flowchart for explaining an operation of the receiving side terminal device 100b when a message is received in the session established chat.

When a message is sent from the sending side terminal device 100a along with the user ID, the session ID and so on, the chat server 300 receives it and, based on the session managing table 330, sends the session ID, the chat window ID, the URL of the Web page, the position information of the element of HTML and the message to the receiving side terminal device 100b being the chat partner.

As shown in FIG. 13, when the session ID, the message and so on are received from the chat server 300 (step S1301), the receiving side terminal device 100b, by the chat window managing section 112, first refers to the managing table 120 to check whether the chat window ID corresponding to the received session ID is already set (step S1302). Then, if the corresponding chat window ID is already set, the receiving side terminal device 100b, by the chat window displaying section 111, displays the received message in the chat window 412 identified by the chat window ID (step S1303).

On the other hand, if the corresponding chat window ID is not set, the receiving side terminal device 100b, by the chat window managing section 112, sets the received session ID and chat window ID in the managing table 120 (step S1304). Then, the receiving side terminal device 100b, by the chat window displaying section 111, displays the chat window 412 at a position determined based on the received position information of the element of HTML (step S1305). Further, if the Web page itself, including the element, is not displayed, the receiving side terminal device 100b newly opens the browser window 411 and displays the Web page based on the received URL, and then displays the chat window 412 at the foregoing position on the Web page.

After displaying the chat window 412 as described above, the receiving side terminal device 100b, by the chat window displaying section 111, displays the received message in the chat window 412 (step S1303).

FIG. 14 is a diagram schematically showing the state of a chat realized in this embodiment. FIG. 14 shows the state wherein a customer and an agent on the sales side are performing a chat on a shared Web page introducing products, and further, the agent and a supervisor are performing a chat.

In FIG. 14, a customer (user ID=cust1, address=10.12.3.1) and an agent (user ID=agent1, address=9.68.1.1) are conducting a chat in chat windows 1401 and 1402 and in chat windows 1403 and 1404, and exchanging information about products named "64 MB (MegaByte) memory" and "128 MB memory".

Here, each of the chat windows 1401 and 1402 is displayed at a position adjacent to "64 MB memory" (element such as text or image data of product), wherein chat window ID=123 and session ID=1019. Similarly, each of the chat windows 1403 and 1404 is displayed at a position adjacent to "128 MB memory" (element such as text or image data of product), wherein chat window ID=789 and session ID=1019. Because addresses of connection targets (sending side terminal device 100a and receiving side terminal device 100b) are identical with respect to the chat windows 1401 and 1402 and the chat windows 1403 and 1404, the same session ID is allocated.

On the other hand, the agent and a supervisor (user ID=super1, address=9.33.4.5) are conducting chat in chat windows 1405 and 1406, and exchanging information for confirming whether to offer "in-house important information" to the customer.

Here, each of the chat windows 1405 and 1406 is displayed at a position adjacent to a text described as "in-house important information", wherein chat window ID=456 and session ID=1020.

Specifically, in FIG. 14, the agent has received a question from the customer about the products in the chat performed in the chat windows 1402 and 1404, and is having the chat with the supervisor in the chat window 1405 to ask for instructions of the supervisor about offering the in-house important information.

As shown in the figure, the chat window 1402 in the terminal device 100 of the agent is displayed at the same position as that of the chat window 1401 in the terminal device 100 of the customer, and the chat window 1404 in the terminal device 100 of the agent is displayed at the same position as that of the chat window 1403 in the terminal device 100 of the customer. Similarly, the chat window 1406 in the terminal device 100 of the supervisor is displayed at the same position as that of the chat window 1405 in the terminal device 100 of the agent.

Further, in the terminal device 100 of the agent, a plurality of independent chat sessions, i.e. the chat session in the cat windows 1402 and 1404 and the chat session in the chat window 1405, are executed.

FIG. 15 is a flowchart for explaining operations of the terminal devices 100 and the chat server 300 when finishing the chat.

As shown in FIG. 15, when finishing the chat, the user of the terminal device 100 first inputs a chat finish command into the terminal device 100 (step S1501). For example, the command can be input by right-clicking the mouse on the chat window 412 of the chat to be finished, and clicking "finish chat" from the displayed menu.

In response to this click operation, the terminal device 100 deletes the associated chat window ID and those data stored correspondingly thereto in the managing table 120. Then, the terminal device 100 sends the user ID and the chat window ID, and a chat finish notification about the chat window ID, to the chat server 300 (step S1502).

When the chat finish notification is received, the chat server 300, by the session managing section 312, refers to the session managing table 330 and sends the chat window ID, the session ID and a chat finish notification to the terminal device 100 being a chat partner in the chat concerned. Further, the chat server 300 deletes the associated session ID and its corresponding data in the session managing table 330 to execute disconnection processing of the session (step S1503).

The terminal device 100 having received the chat finish notification deletes the associated chat window ID and its corresponding data in the managing table 120, and outputs a message notifying the finish of the chat to inform the user (step S1504).

The operation for finishing the chat is not necessarily implemented by the terminal device 100 having made the session establishment request (step S902 in FIG. 9), i.e. the sending side terminal device 100a, and thus, the operation at step S1501 can, of course, be implemented also by the receiving side terminal device 100b.

Now, the operation in the asynchronous mode will be described.

The asynchronous mode is an operation mode wherein, when the session can not be established relative to the receiving side terminal device 100b being a chat partner, a chat message is temporarily kept in the chat server 300, which is supported by the asynchronous mode managing section 316 of the chat server 300. Specifically, in the operations for session establishment as shown at steps S1005 and S1006 in FIG. 10 and as shown in FIG. 12, when the session can not be established relative to the receiving side terminal device 100b, a message can be input in advance of the establishment of a session relative to the receiving side terminal device 100b according to the asynchronous mode.

FIG. 16 is a flowchart for explaining operations of the sending side terminal device 100a and the chat server 300 when inputting a message in the asynchronous mode. FIG. 17 is a flowchart for explaining an operation of the chat server 300 when a session is established relative to the target receiving side terminal device 100b.

In FIG. 16, a user wishing to input a message in the asynchronous mode logs on the chat server 300 with the same operation as steps S901 to S905 in FIG. 9 using the sending side terminal device 100a (step S1601), and then sends to the chat server 300 a connection request for connection to the receiving side terminal device 100b selected as a connection target in the asynchronous mode (step S1602). To this connection request are added the user ID, the chat window ID and the information identifying the receiving side terminal device 100b. On the other hand, it may also be arranged that if the session can not be established relative to the connection target receiving side terminal device 100b when the connection request is sent at step S906 in FIG. 9, the asynchronous mode is automatically entered.

When the connection request in the asynchronous mode is received, the chat server 300, by the asynchronous mode managing section 316, first prepares an asynchronous mode managing table 350, produces a unique ID (AsyncID) for the connection request, and sets it in the asynchronous mode managing table 350 (step S1603).

FIG. 18 is a diagram showing an example of the asynchronous mode managing table 350. The asynchronous mode managing table 350 is stored in the storage device of the chat server 300.

Referring to FIG. 18, a chat window ID of a chat window 412 for conducting a chat upon establishment of the session is stored correspondingly to the AsyncID.

Further, the chat server 300, by the chat window managing section 311, produces a session ID and sets it to the associated chat window ID in the chat window managing table 320. Then, the chat server 300, by the session managing section 312, sets the session ID of the session concerned, the address of the sending side terminal device 100a and the address of the receiving side terminal device 100b in the session managing table 330. Further, the chat server 300, by the asynchronous mode managing section 316, sets the chat window ID in the asynchronous mode managing table 350 (step S1604). Thereafter, the chat server 300 sends the AsyncID, the chat window ID and the session ID to the sending side terminal device 100a.

When the foregoing respective IDs are received from the chat server 300, the sending side terminal device 10a, by the chat window managing section 112, sets the session ID correspondingly to the associated chat window ID in the managing table 120 (step S1605). Then, the sending side terminal device 100a, by the chat window displaying section 111, displays the chat window 412 for the chat and further displays a given mark at a position of the element of HTML pointed by the chat window 412 (step S1606).

Then, the user inputs a message relative to the chat window 412 and commands sending thereof (step S1607). In response thereto, the sending side terminal device 100a, by the chat window managing section 112, refers to the managing table 120 to acquire the session ID stored correspondingly to the associated chat window ID, and sends it to the chat server 300 along with the user ID, the chat window ID and the input message (step S1608).

When the input message and so on are received, the chat server 300, by the chat window managing section 311, sets the input message correspondingly to the associated chat window ID in the chat window managing table 320 (step S1609).

Then, as shown in FIG. 17, when a session establishment request including the user ID and the AsyncID is received from the terminal device 100 (step S1701), the chat server 300, by the asynchronous mode managing section 316, first acquires the chat window ID corresponding to the AsyncID, and then by the session managing section 312, acquires a sender address. Based on a separately prepared table showing correspondence between user addresses and user IDs, the chat server 300 acquires the user ID from the sender address to check whether the user having made the session establishment request is proper or not (step S1702). If the user having made the session establishment request is the user having made the input according to the asynchronous mode, the chat server 300 judges that the user is proper. If otherwise, the chat server 300 judges that the user is improper, and finishes the processing (step S1703).

After judging that the user is proper, the chat server 300, by the session managing section 312, identifies the receiving side terminal device 100b in the session concerned, and attempts to establish the session (step S1704).

Then, if the session is established, the chat server 300, by the asynchronous mode managing section 316, refers to the asynchronous mode managing table 350 to acquire the chat window ID corresponding to the associated asynchronous mode, and then by the chat window managing section 311, acquires the message stored correspondingly to the associated chat window ID from the chat window managing table 320, and sends the acquired message to all the terminal devices 100 (on both sending and receiving sides) participating in the session (steps S1705 and S1706). To sending information including this message are added the chat window ID of the chat window 412 where the message is entered, the URL of the Web page including the element being an object of the chat, the position information of the element, and the session ID.

The terminal device 100 having received the foregoing sending information, by the chat window managing section 112, sets the received session ID and chat window ID in the managing table 120. Then, by displaying the chat window 412 at a position determined based on the received position information of the element of HTML by means of the chat window displaying section 111, a chat including the message that has been kept in the asynchronous mode can be started.

As described above, by using the collaboration system and the chat system utilized in the collaborative work thereof according to this embodiment, the chat window 412 is displayed at the position pointing the given element on the Web page. Therefore, the object of the chat can be recognized based on the position of the chat window 412, thereby to facilitate the communication.

Further, a plurality of chat windows 412 can be displayed for the respective elements on the Web page, and a session can be established independently per chat window 412 to allow an independent chat. Therefore, information can be exchanged through a chat with a proper chat partner per element, and an access control can be executed individually per element. Further, the chat content can be stored independently per chat window 412, or the chat contents in a plurality of chat windows 412 can be collectively stored, in the chat content keeping section 113, 315 of the terminal device 110 or the chat server 300.

Further, by displaying the mark at the element associated with the chat window 412 using the annotation function or the like provided in the collaboration system, the user can recognize that the chat window 412 is set relative to the element, irrespective of whether the chat window 412 is displayed or not.

Further, by managing the asynchronous mode wherein a message to be sent in a chat is temporarily stored in the chat server 300, even if a session can not be established relative to a partner to chat with so that a realtime chat is not made possible, the terminal devices 100 on both sending and receiving sides can acquire the message retroactively when the session is established, so that the communication can be facilitated.

In the foregoing embodiment, explanation has been made of, as an example, the chat system used as communication means in the collaboration system supporting the collaborative work performed on the Web page. However, the present invention is, of course, not limited to the structure shown in the foregoing embodiment. For example, the chat system can be used alone, or can be used in association with another system that executes information exchange via the network. In this event, instead of the association with the Web page and the correspondence to the element of HTML as described above, the association with a window and the correspondence to an element are performed in an application program associated with the chat system.

ADVANTAGES OF THE INVENTION

As described above, according to the present invention, a chat can be conducted by designating clearly and simply a position of an object to be noticed in a working image, in the collaboration system and its chat system.

BRIEF DESCRIPTION OF THE DRAWINGS

FIG. 5 is a diagram showing an example of a chat window managing table used by a chat window managing section in the embodiment of the present invention;

FIG. 6 is a diagram showing an example of a session managing table used by a session managing section in the embodiment of the present invention;

FIG. 7 is a diagram showing an example of an ACL registering a Web page (URL) being an object of collaborative work and users who are accessible to an element thereof;

FIG. 8 is a diagram showing an example of an ACL registering a combination of users who can chat;

FIG. 11 is a diagram showing an example of a selection window for selecting a connection target;

Figure 1:
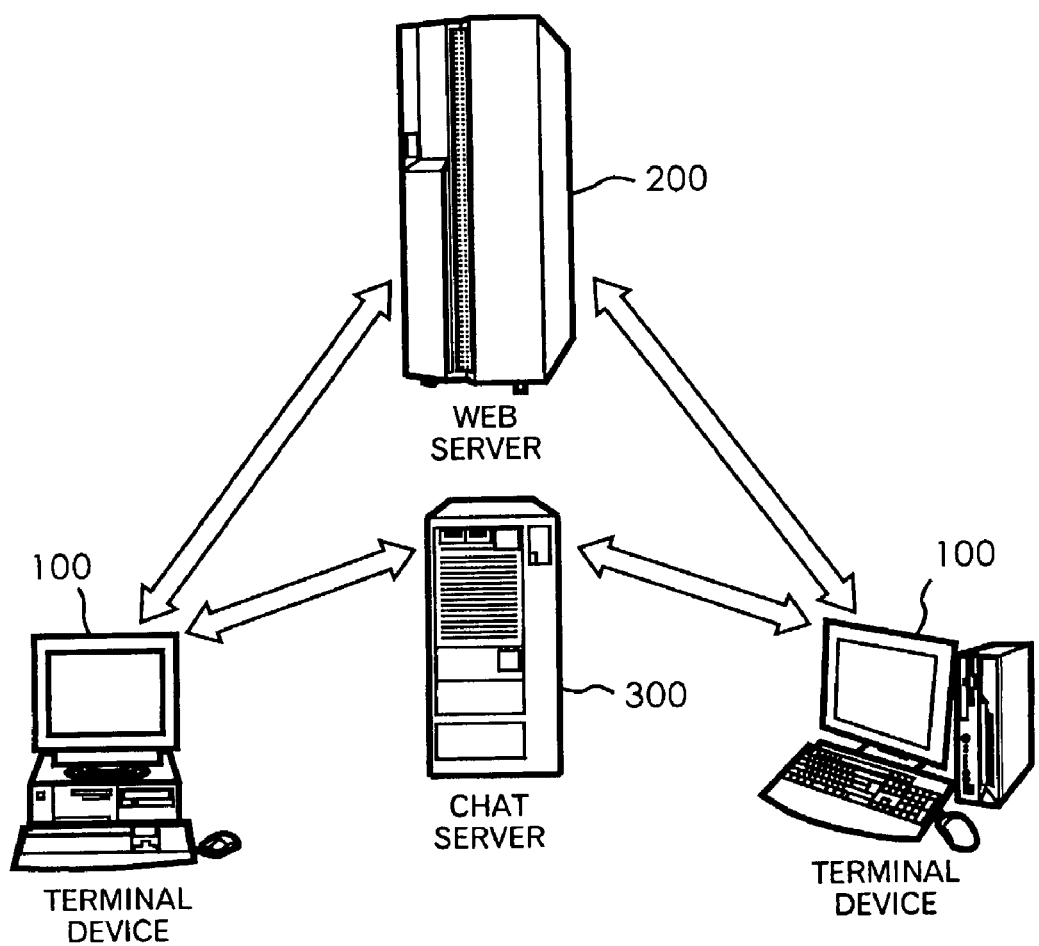
FIG. 1 is a diagram showing the overall structure of a collaboration system according to an embodiment of the present invention.
Figure 2:
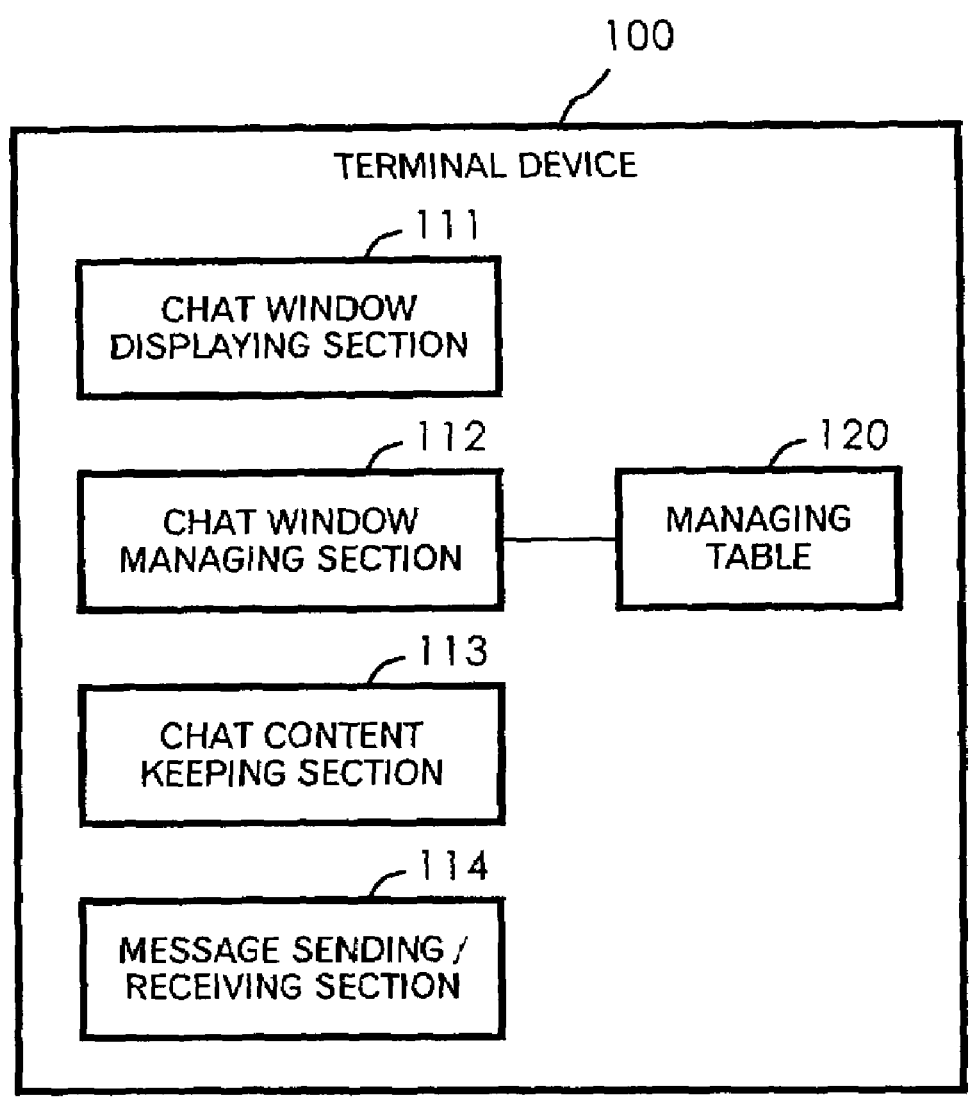
FIG. 2 is a functional block diagram showing a functional configuration of a terminal device in the embodiment of the present invention.
Figure 3:
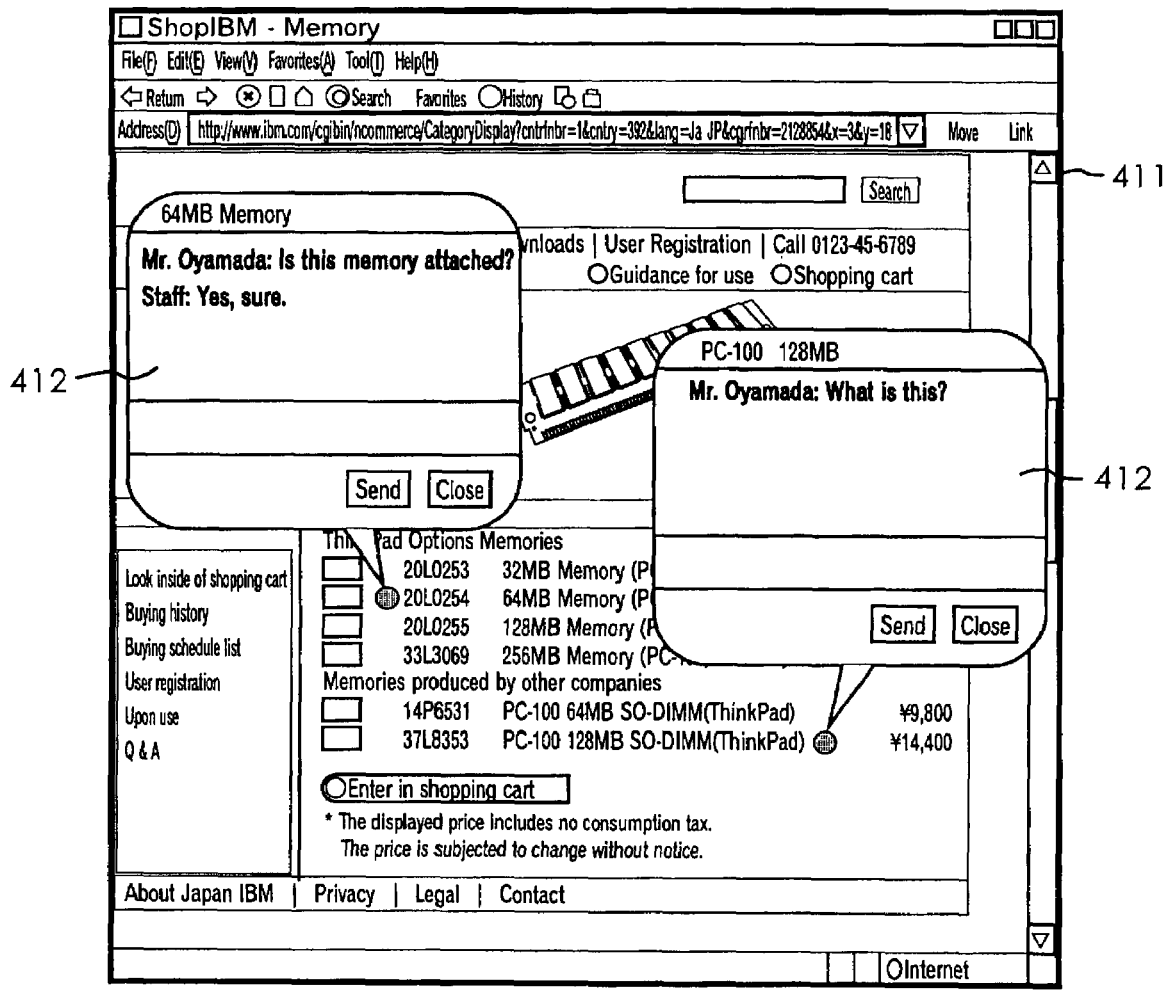
FIG. 3 is a diagram showing the state wherein chat windows are displayed in a browser window according to the embodiment of the present invention.
Figure 4:
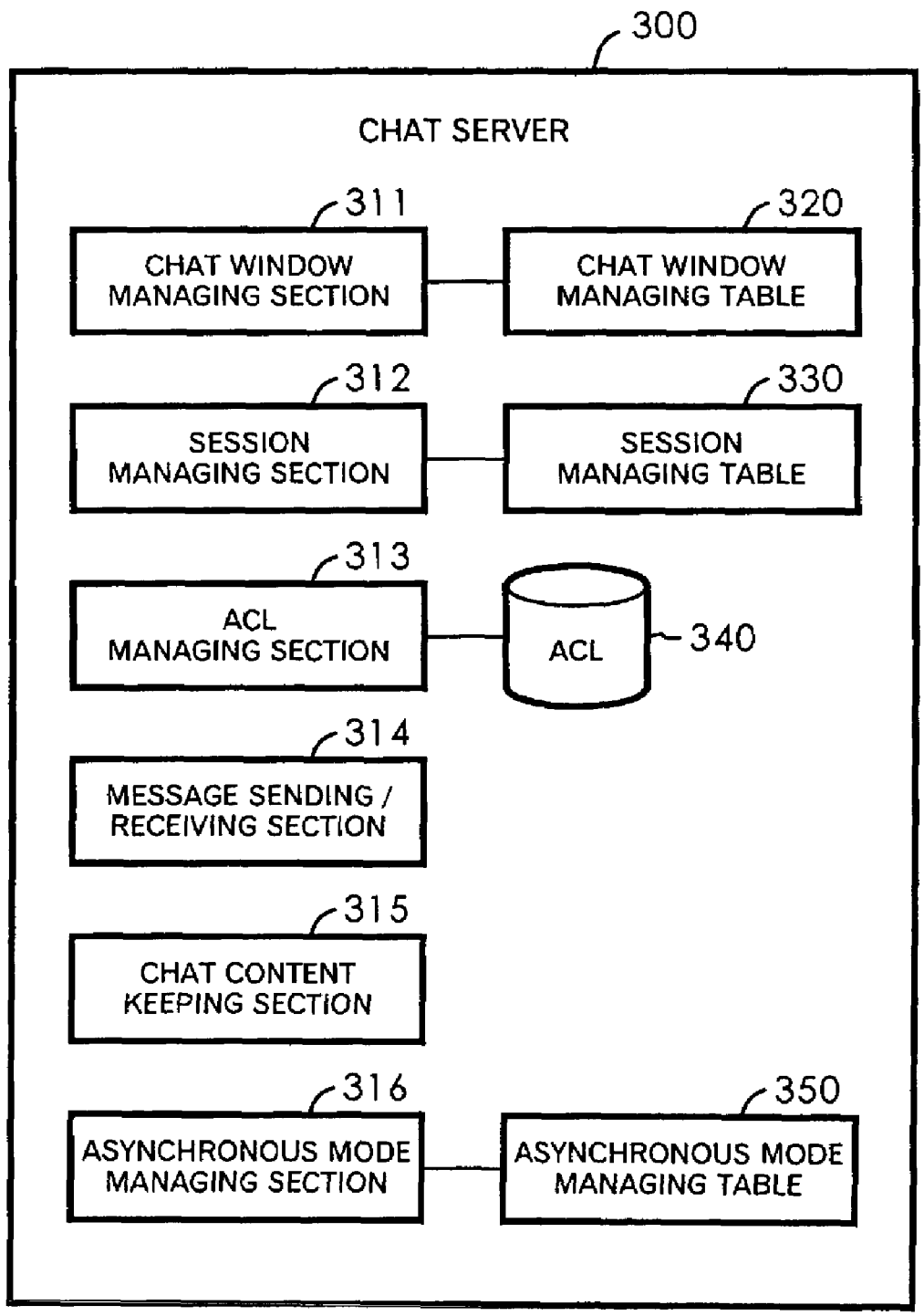
FIG. 4 is a functional block diagram showing a functional configuration of a chat server in the embodiment of the present invention.
Figure 9:
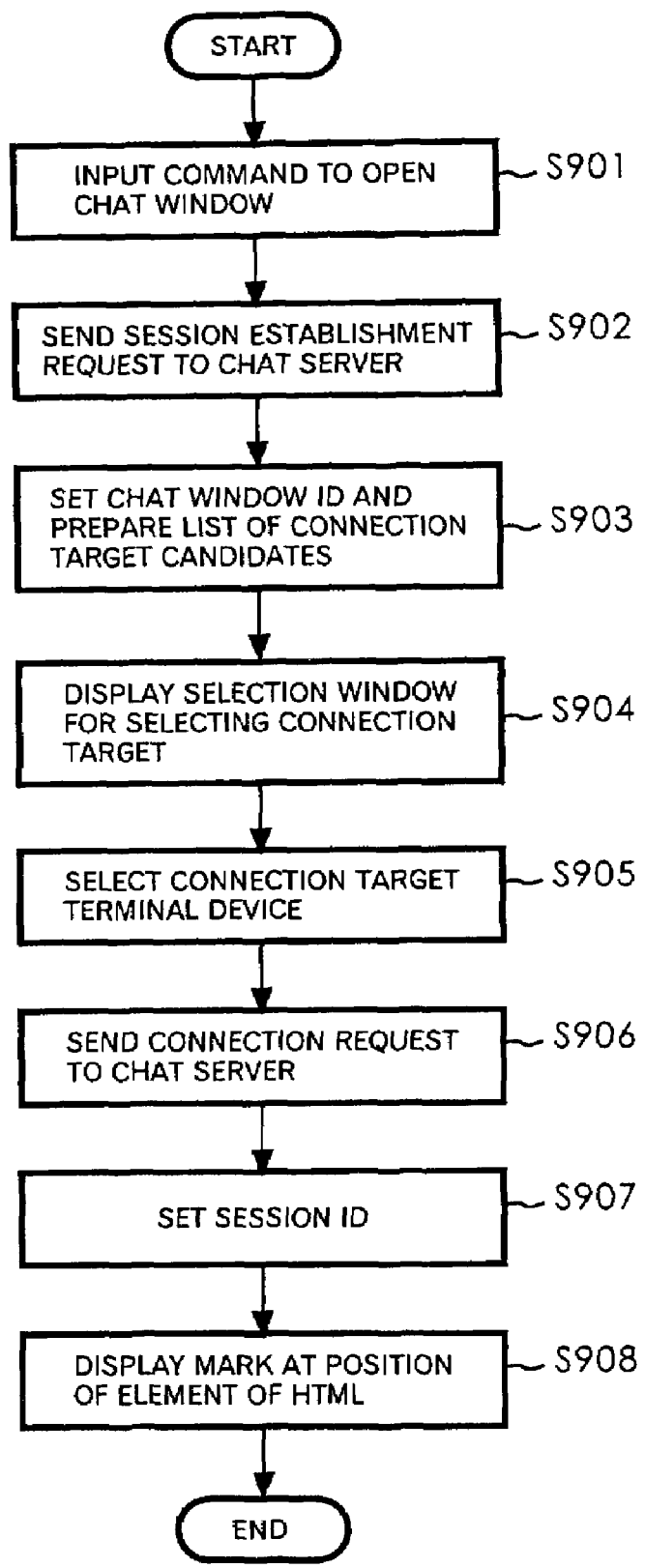
FIG. 9 is a flowchart for explaining an operation when a terminal device going to start a chat accesses the chat server to establish a session.
Figure 10:
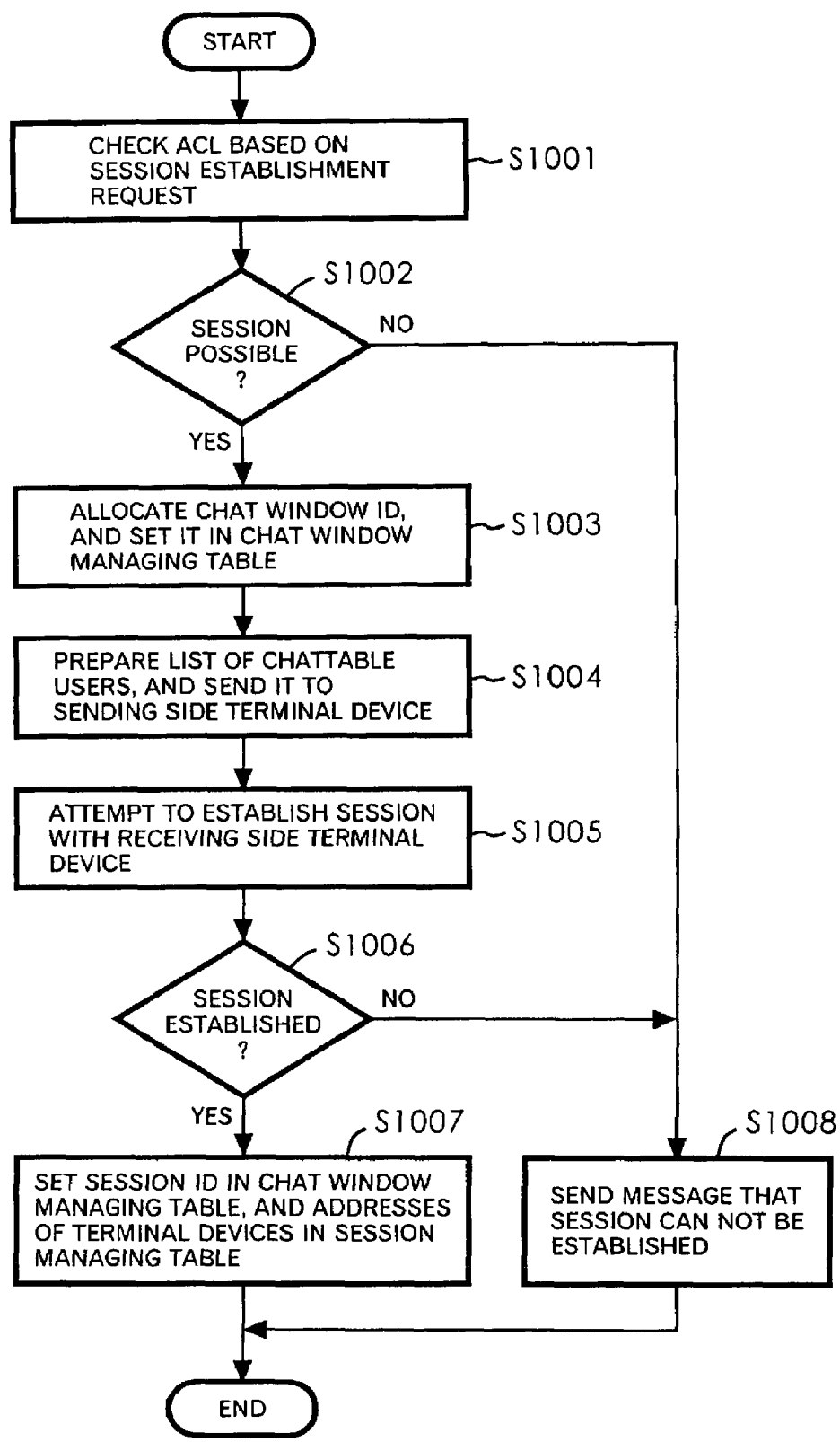
FIG. 10 is a flowchart for explaining an operation of the chat server when a request for establishment of a session is received from the terminal device.
Figure 12:
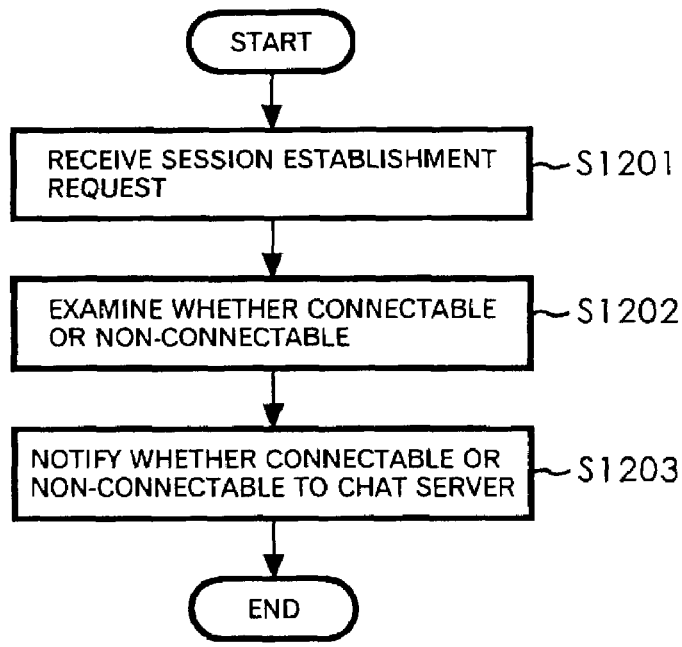
FIG. 12 is a flowchart for explaining an operation of a receiving side terminal device when a session is established between the chat server and the receiving side terminal device.
Figure 13:
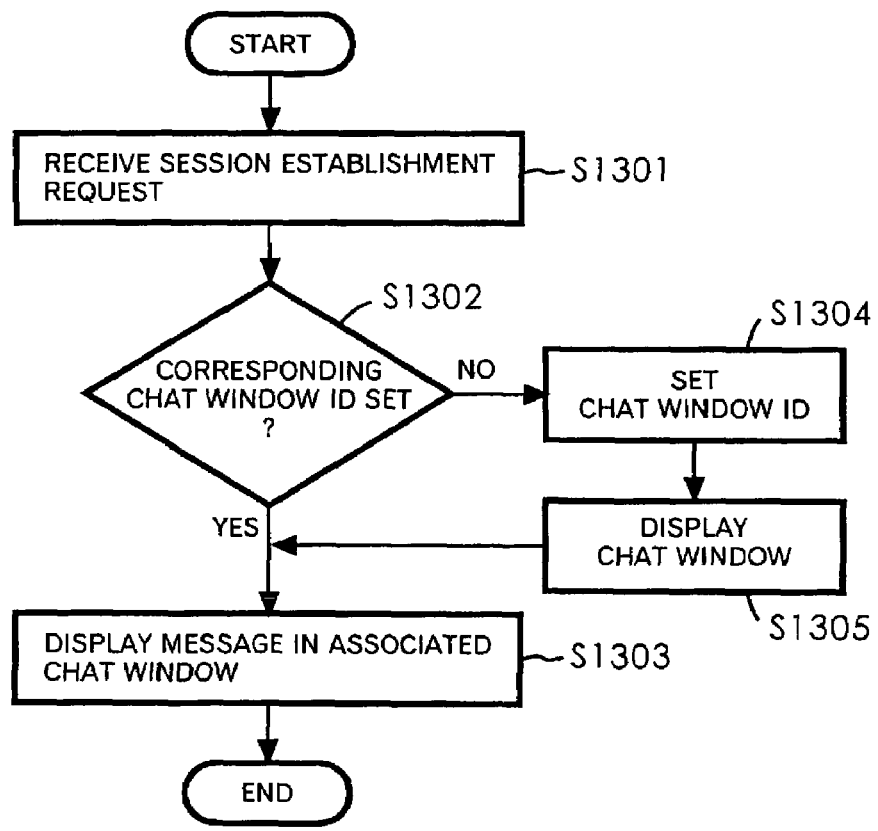
FIG. 13 is a flowchart for explaining an operation of the receiving side terminal device when a message is received in a session established chat.
Figure 14:
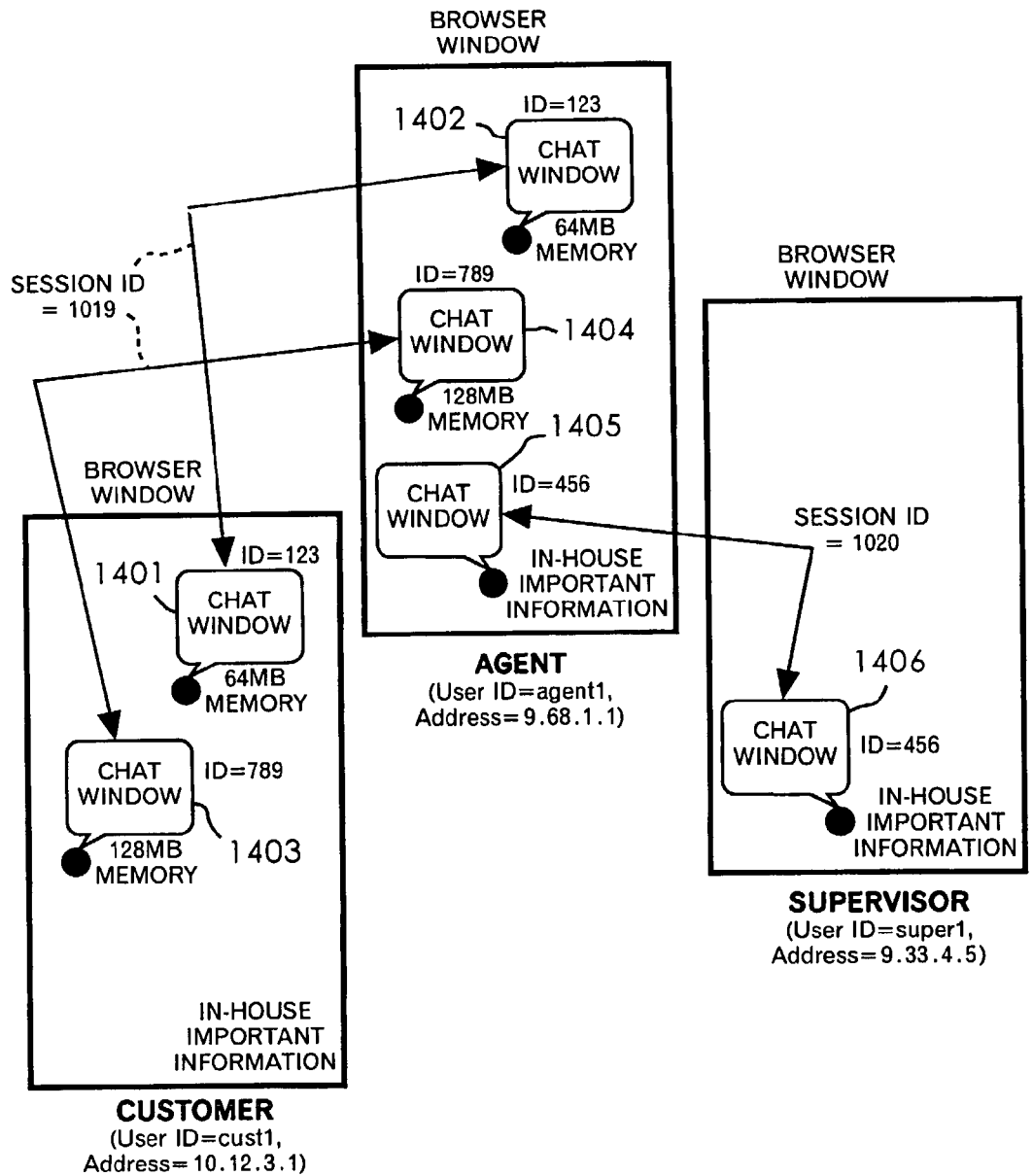
FIG. 14 is a diagram schematically showing the state of a chat realized in the embodiment of the present invention.
Figure 15:
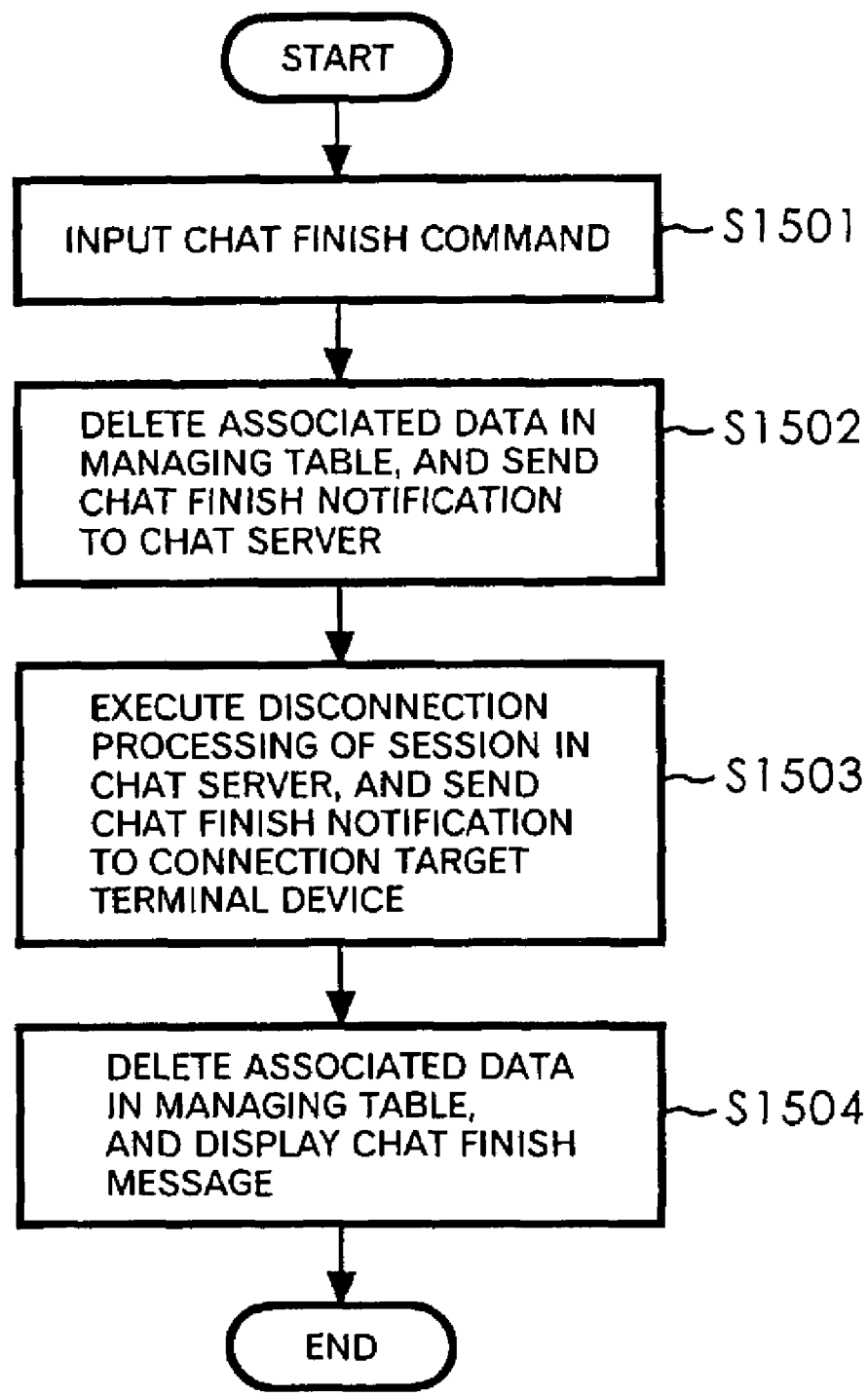
FIG. 15 is a flowchart for explaining operations of the terminal devices and the chat server when finishing a chat.
Figure 16:
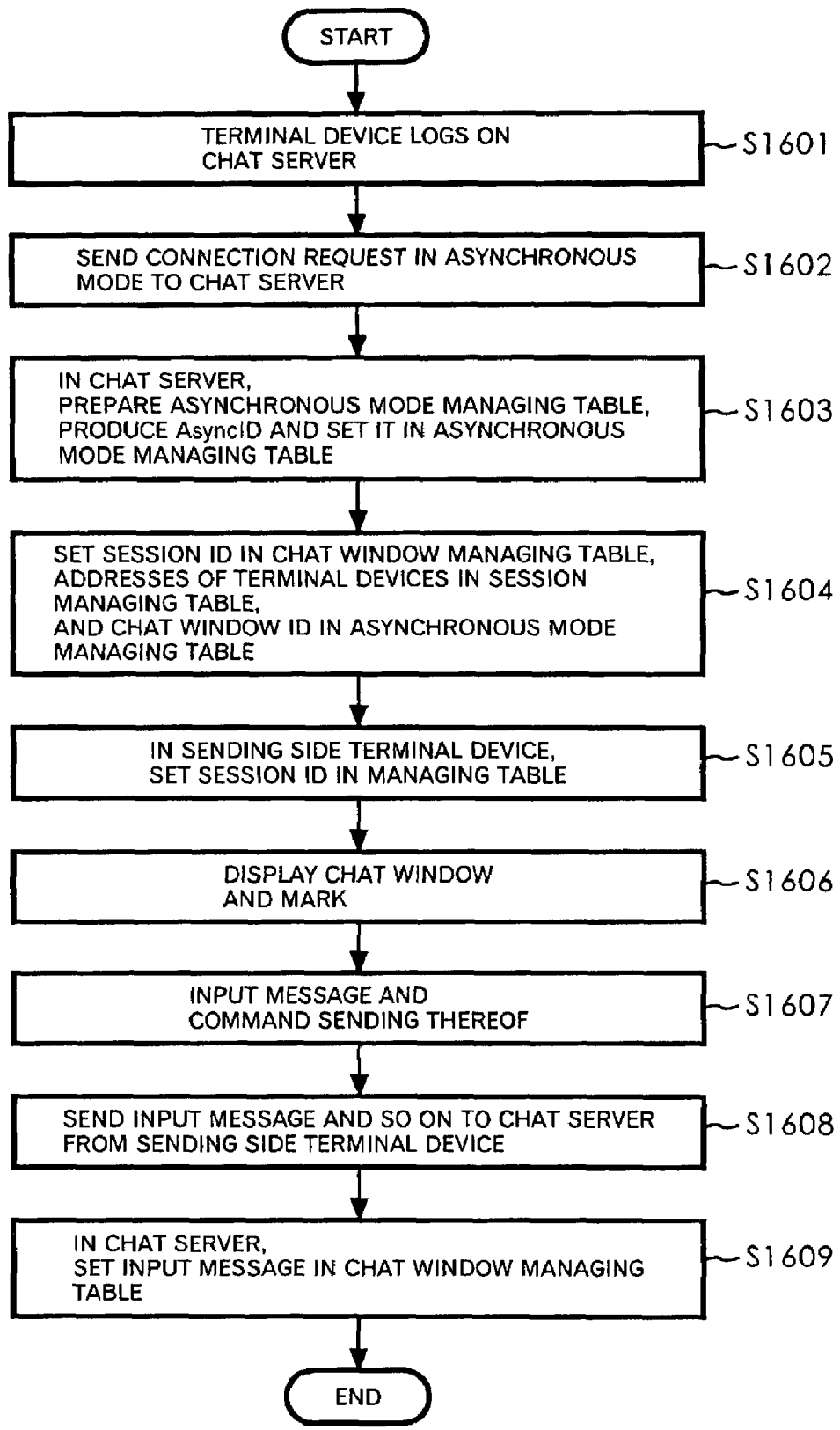
FIG. 16 is a flowchart for explaining operations of a sending side terminal device and the chat server when inputting a message in an asynchronous mode in the embodiment of the present invention.
Figure 17:
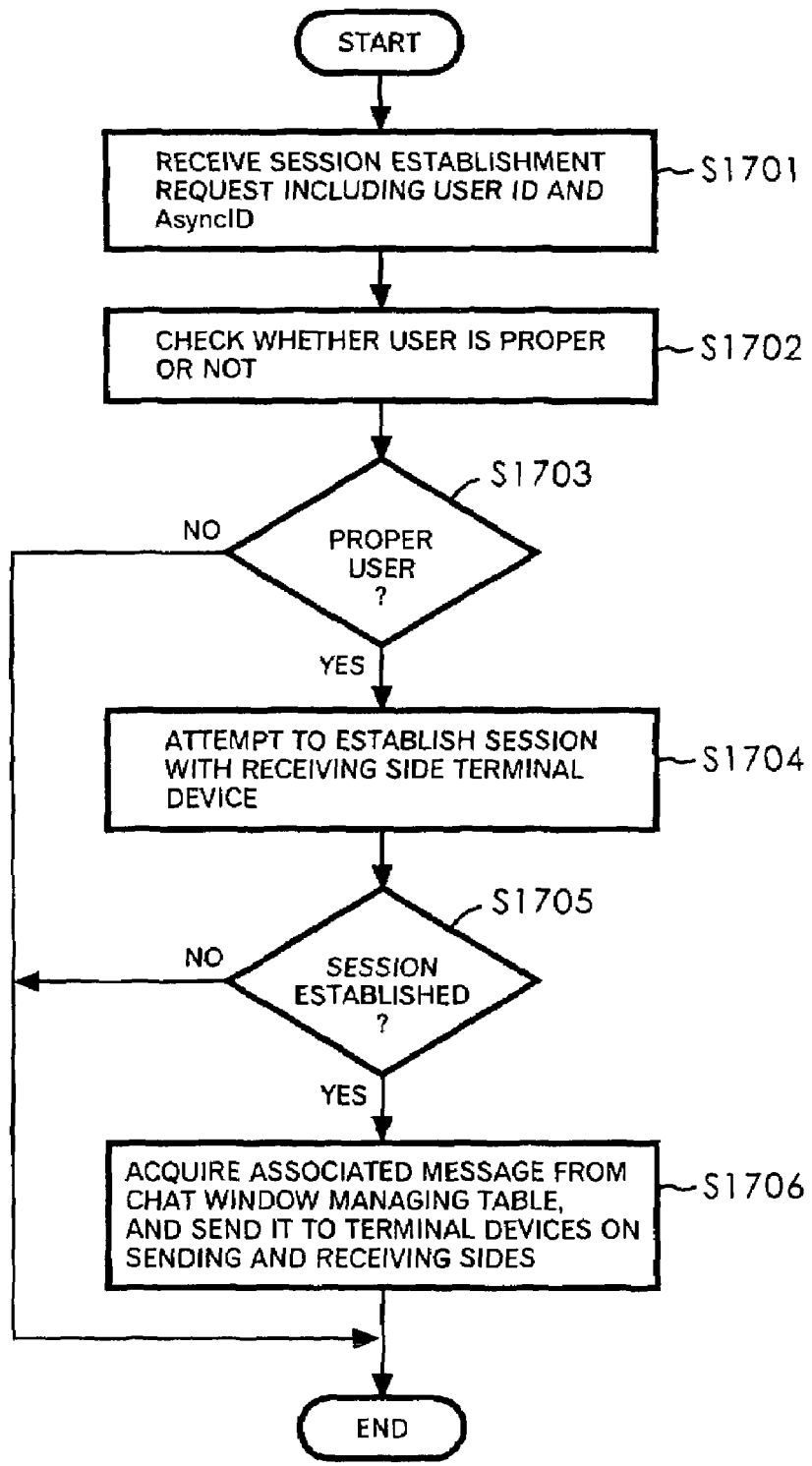
FIG. 17 is a flowchart for explaining an operation of the chat server when a session is established relative to a target receiving side terminal device.
Figures 18, 19:
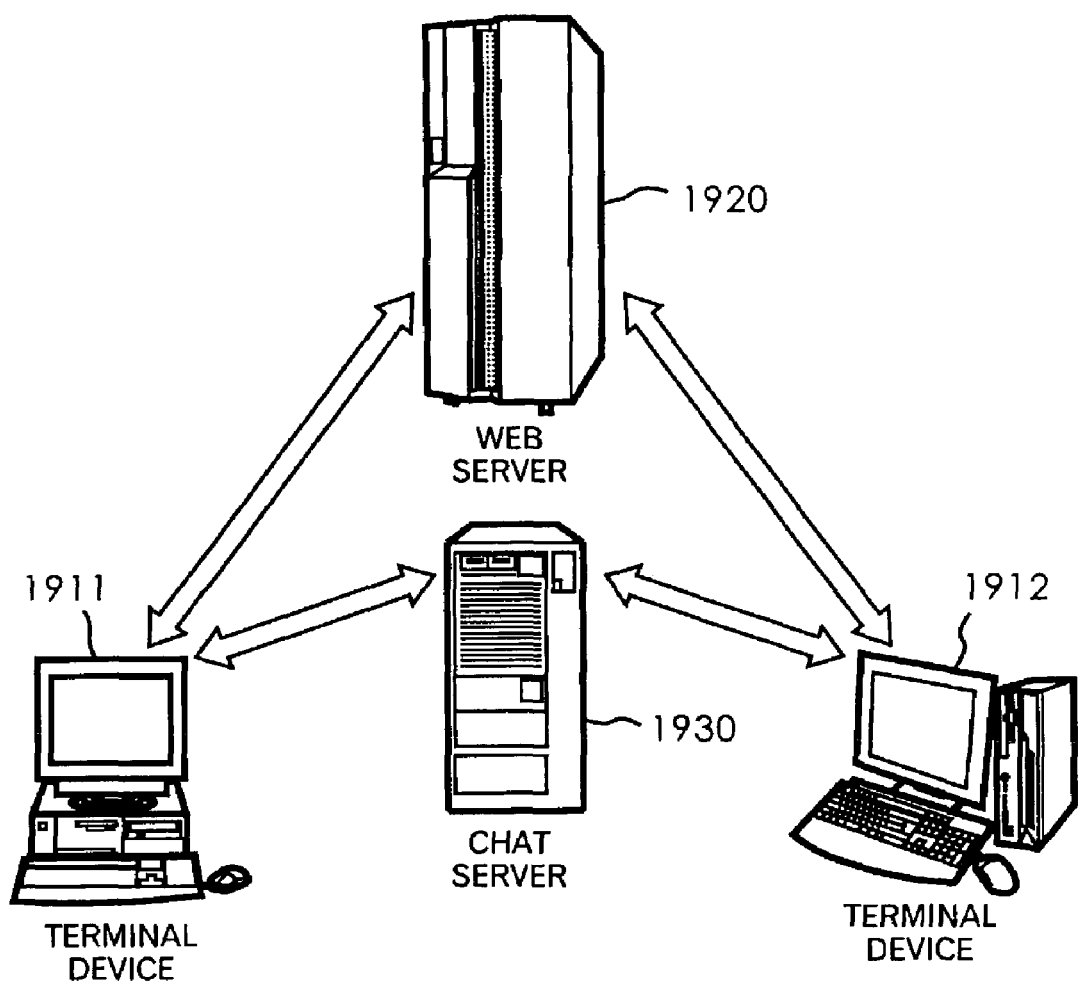
FIG. 18 is a diagram showing an example of an asynchronous mode managing table used in the asynchronous mode in the embodiment of the present invention.
FIG. 19 is a diagram showing an example of a schematic structure of a collaboration system.

What is claimed:

1. An information exchange control method for a chat server supporting a chat conducted by a plurality of terminal devices connected to each other via a network, comprising the steps of:

receiving from a certain terminal device a session establishment request including a display position information of a particular element adjacent to a chat area for performing a chat;

determining in the Access Control List managing section whether an establishment of a chat session is possible by checking an Access Control List with respect to the particular element based on a user ID, a Universal Resource Locator, and the display position information;

sending to the certain terminal device a list of users that are available for establishing the chat session in response to determining that the chat session can be established, wherein the list of users is based on the particular element and the particular Universal Resource Locator;

establishing the chat session among the plurality of terminal devices in response to a selection of a target terminal device;

receiving a message from the certain terminal device; and sending said message and the display position of said chat area to the target terminal device.

2. An information exchange control method according to claim 1, further comprising the steps of preserving said message when said chat session can not be established, and sending said message to the target terminal device after said chat session is established.

3. An information exchange control method according to claim 1, wherein the display position of said chat area is position information corresponding to the particular element on a Web page, and said message is received with said position information at the step of receiving said message.

* * * * *